Feb. 22, 1927.

G. H. BRAWNER

PISTON

Filed Feb. 16, 1924

1,618,805

Inventor
G. H. Brawner
By Jack A. Ashley
Attorney

Patented Feb. 22, 1927.

1,618,805

UNITED STATES PATENT OFFICE.

GEORGE H. BRAWNER, OF DALLAS, TEXAS, ASSIGNOR, BY DIRECT AND MESNE ASSIGNMENTS, TO BRAWMAN PISTON RING MANUFACTURING COMPANY, OF DALLAS, TEXAS, A CORPORATION.

PISTON.

Application filed February 16, 1924. Serial No. 693,215.

This invention relates to new and useful improvements in pistons.

The cylinders of motors and engines after a certain period of use become worn. In certain instances, as in V-types the cylinders wear "out of round" and it is impossible to fit the same with an ordinary piston.

The object of the invention is to provide a piston having such flexibility as to conform itself to the walls of irregular shaped cylinders, thus affording better compression and eliminating "slapping" and oil pumping.

A further object is to provide the upper and lower ends of a piston with a plurality of flexible and resilient fingers or segments for engaging the walls of the cylinders, and conforming thereto.

Another object of the invention is to provide a two part piston arranged to lock a wrist pin therein and to conceal the same, whereby its end cannot shift and score the cylinder, together with means for utilizing the excess oil from the cylinder walls to lubricate the pin.

A construction designed to carry out the invention will be hereinafter described together with other features of the invention.

Figure 1:
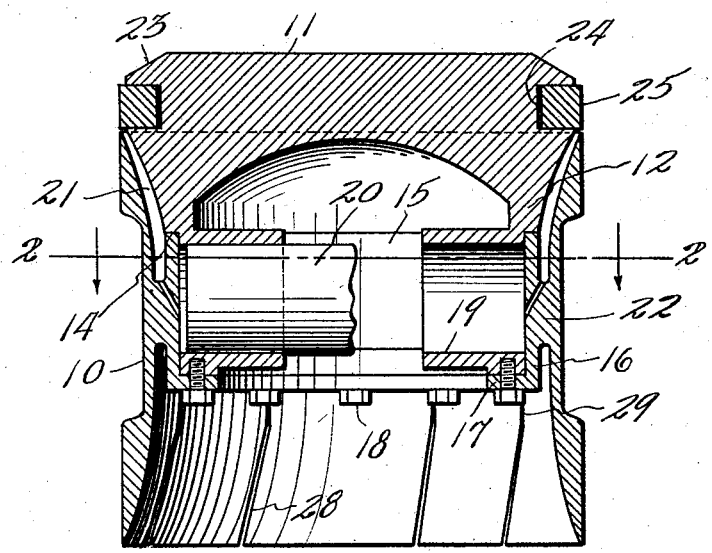
Figure 2:
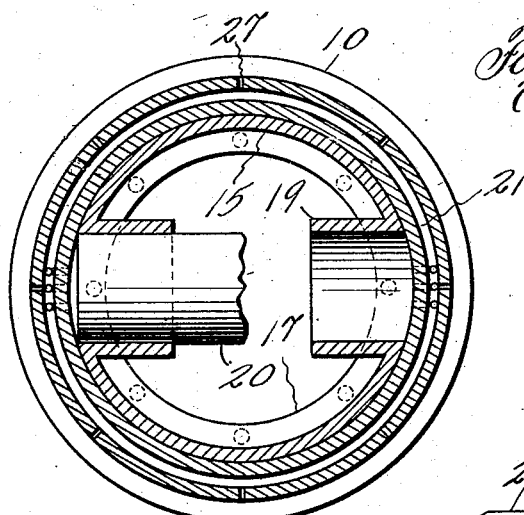
Figure 3:
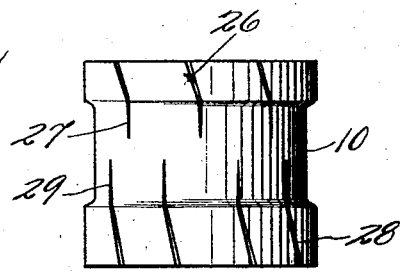
Figure 4:
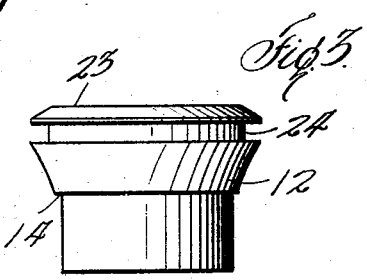

The invention will be more readily understood from a reading of the following specification and by reference to the accompanying drawings, in which an example of the invention is shown, and wherein:

Fig. 1 is a vertical sectional view of a piston constructed in accordance with my invention, Fig. 2 is a cross-sectional view on the line 2—2 of Fig. 1, Fig. 3 is an elevation of the sleeve of the piston, and Fig. 4 is an elevation of the head portion.

In the drawings the numeral 10 designates a cylindrical sleeve forming the sides of my piston and 11 the head which provides the top and ring groove, The head has a depending core 12 fitting in the upper end of the sleeve providing an annular seat 14 in the sleeve. A cylindrical apron 15 depends from the core within the shoulder. The central portion of the sleeve is reduced in diameter and is formed with an internal collar 16 in which the apron snugly fits. The collar has an inwardly directed flange 17 at its lower edge on which the apron rests. Machine bolts 18 passed up through the flange are engaged in the apron for holding the parts together.

Within the apron are arranged diametrically opposite thimbles 19 in which a wrist pin 20 is mounted. The ends of the pin are covered by the collar 16 and housed. The core is cut out above the thimbles and also has its outer surface flared outwardly to form the inner side of an annular channel 21, the outer side of which is formed by the sleeve. At the bottom of this channel are parts 22 leading down through the collar 16 to lubricate the ends of the pin.

The head has its top 23 beveled and is less in diameter than the sleeve. A circumferential groove 24 is formed in the head above the sleeve. A suitable piston ring 25 is sealed in the groove and overhangs the upper end of the channel 21. The upper end of the sleeve is reduced to a thin annular edge lying just under the ring.

The upper end of the sleeve has inclined kerfs 26 registering with vertical kerfs 27, the latter extending down into the contracted portion of the sleeve. These kerfs divide the upper end of the sleeve into a plurality of resilient fingers and make the sleeve flexible where it contacts with the cylinder. By inclining the kerfs 26 they will not score the cylinder walls. The skirt or lower end of the sleeve has inclined kerfs 28 and is reduced to a thin edge. The kerfs 28 merge into kerfs 29 in the contracted portion of the sleeve. The sleeve is thus made flexible over its entire contacting surface and when made of the proper diameter, will snugly fit any cross-section into which the cylinder may be worn.

What I claim is:

1. In a piston, a head having a ring groove, a sleeve fastened around the head and having its upper and lower ends reduced to thin edges and provided with vertical kerfs for making said sleeve flexible.

2. A piston head comprising a ring groove and a sleeve having its intermediate portion reduced diametrically of its entire circumference and provided with cuts extending from its reduced portion longitudinally of the sleeve, whereby its contacting surface is divided into a plurality of flexible fingers.

3. In a piston head, a member having a ring groove and depending apron carrying wrist pin bearings, a sleeve having a collar fitting said apron to enclose said bearings and one free end terminating adjacent said groove and spaced from said apron to form a lubricating passage communicating with said bearings.

4. In a piston head, a head member having a ring groove and wrist pin bearing, a sleeve having a solid portion closing the ends of said bearing and the head at one side of said groove and having its free end next the groove inwardly slitted to provide individually displaceable fingers.

5. In a piston head, a head member having a ring groove and wrist pin bearing, a sleeve having a solid portion closing the ends of said bearing and the head at one side of said groove and having its free end next the groove inwardly slitted to provide individually displaceable fingers spaced from the head to form lubricating passages leading to said bearing.

In testimony whereof I affix my signature.

GEORGE H. BRAWNER.